(12) United States Patent
Shahim et al.

(10) Patent No.: US 11,550,586 B2
(45) Date of Patent: *Jan. 10, 2023

(54) METHOD AND TENSOR TRAVERSAL ENGINE FOR STRIDED MEMORY ACCESS DURING EXECUTION OF NEURAL NETWORKS

(71) Applicant: Deep Vision Inc., Los Altos, CA (US)

(72) Inventors: Mohamed Shahim, Thrissur (IN); Raju Datla, Hyderabad (IN); Rehan Hameed, Los Altos, CA (US); Shilpa Kallem, Hyderabad (IN)

(73) Assignee: Deep Vision Inc., Los Altos, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/331,590

(22) Filed: May 26, 2021

(65) Prior Publication Data

US 2021/0373895 A1 Dec. 2, 2021

Related U.S. Application Data

(60) Provisional application No. 63/030,183, filed on May 26, 2020.

(51) Int. Cl.
| | |
|---|---|
| *G06F 9/345* | (2018.01) |
| *G06F 9/30* | (2018.01) |
| *G06N 3/063* | (2006.01) |
| *G06F 9/50* | (2006.01) |
| *G06F 9/54* | (2006.01) |
| *G06F 3/06* | (2006.01) |
| *G06N 3/02* | (2006.01) |

(52) U.S. Cl.
CPC .......... *G06F 9/3455* (2013.01); *G06F 3/0647* (2013.01); *G06F 3/0655* (2013.01); *G06F 3/0679* (2013.01); *G06F 9/30098* (2013.01); *G06F 9/5016* (2013.01); *G06F 9/544* (2013.01); *G06N 3/063* (2013.01); *G06N 3/02* (2013.01)

(58) Field of Classification Search
CPC .. G06F 9/3455; G06F 9/30098; G06F 9/5016; G06F 9/544; G06F 3/0647; G06F 3/0679; G06N 3/063; G06N 3/02
See application file for complete search history.

(56) References Cited

U.S. PATENT DOCUMENTS

2002/0174272 A1* 11/2002 Fujii ...................... G06F 13/28
710/22

* cited by examiner

*Primary Examiner* — Ernest Unelus
(74) *Attorney, Agent, or Firm* — Run8 Patent Group, LLC; Peter Miller; Brian T. Chew

(57) ABSTRACT

A tensor traversal engine in a processor system comprising a source memory component and a destination memory component, the tensor traversal engine comprising: a control signal register storing a control signal for a strided data transfer operation from the source memory component to the destination memory component, the control signal comprising an initial source address, an initial destination address, a first source stride length in a first dimension, and a first source stride count in the first dimension; a source address register communicatively coupled to the control signal register; a destination address register communicatively coupled to the control signal register; a first source stride counter communicatively coupled to the control signal register; and control logic communicatively coupled to the control signal register, the source address register, and the first source stride counter.

19 Claims, 10 Drawing Sheets

Figure 1:
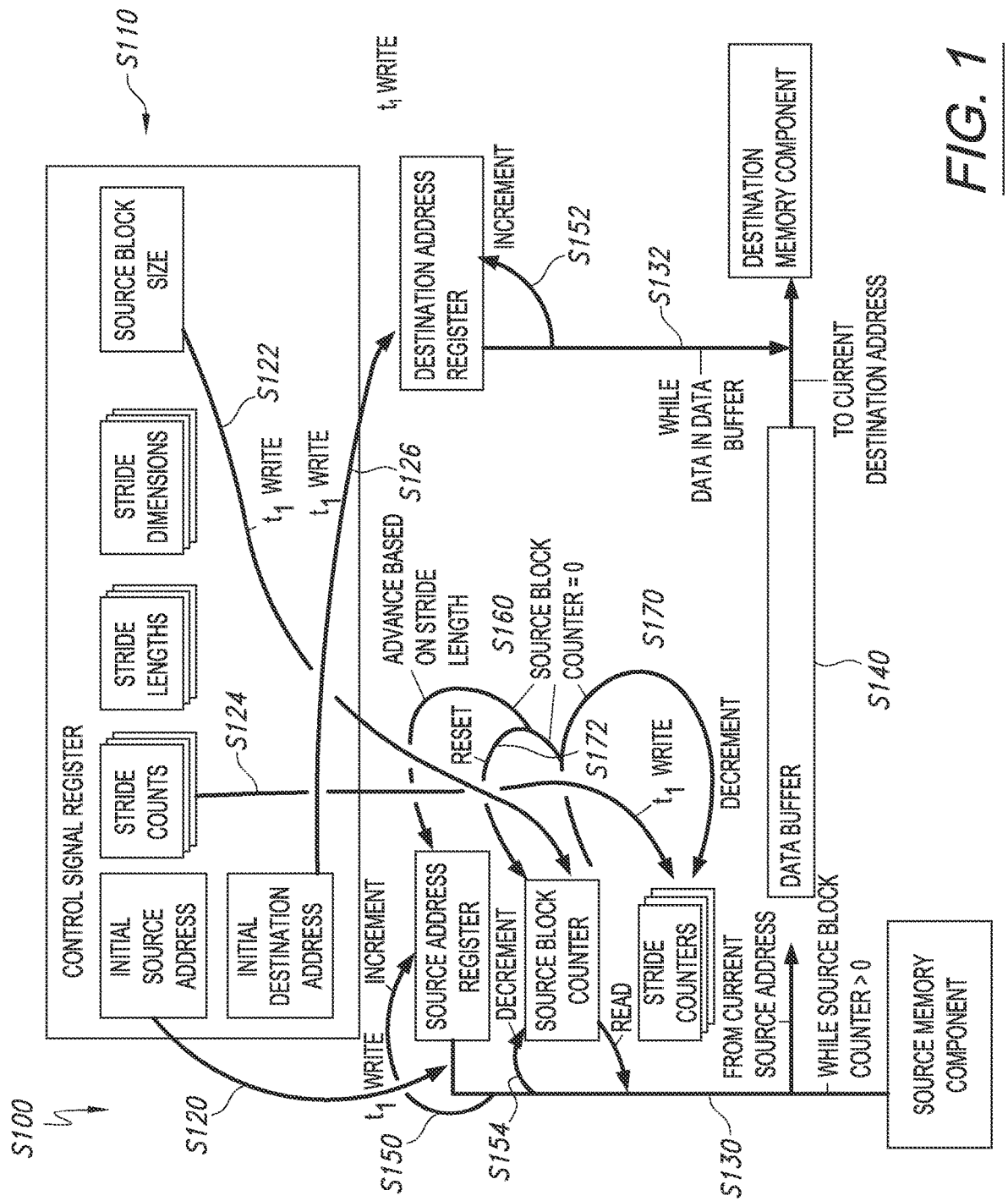
Figure 2:
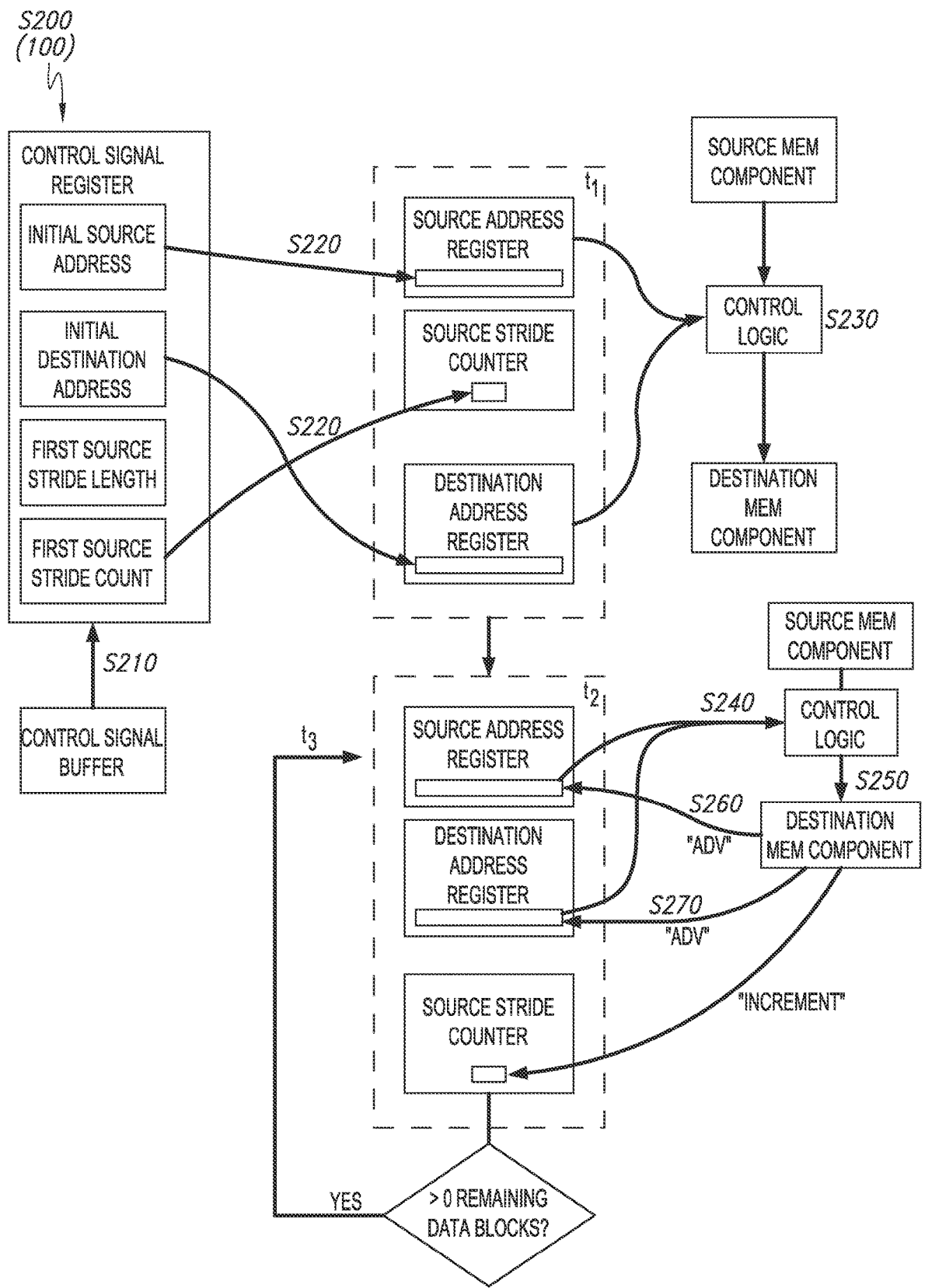

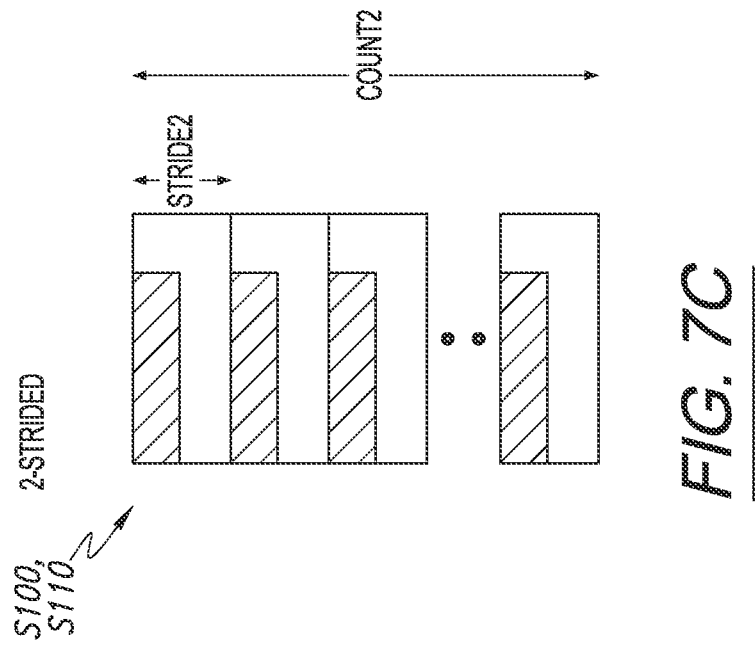
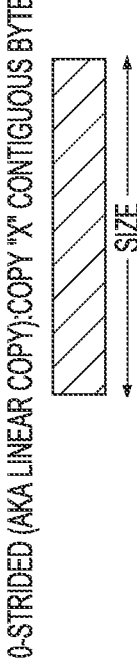
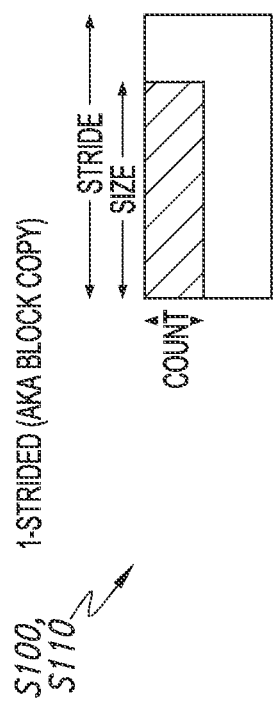

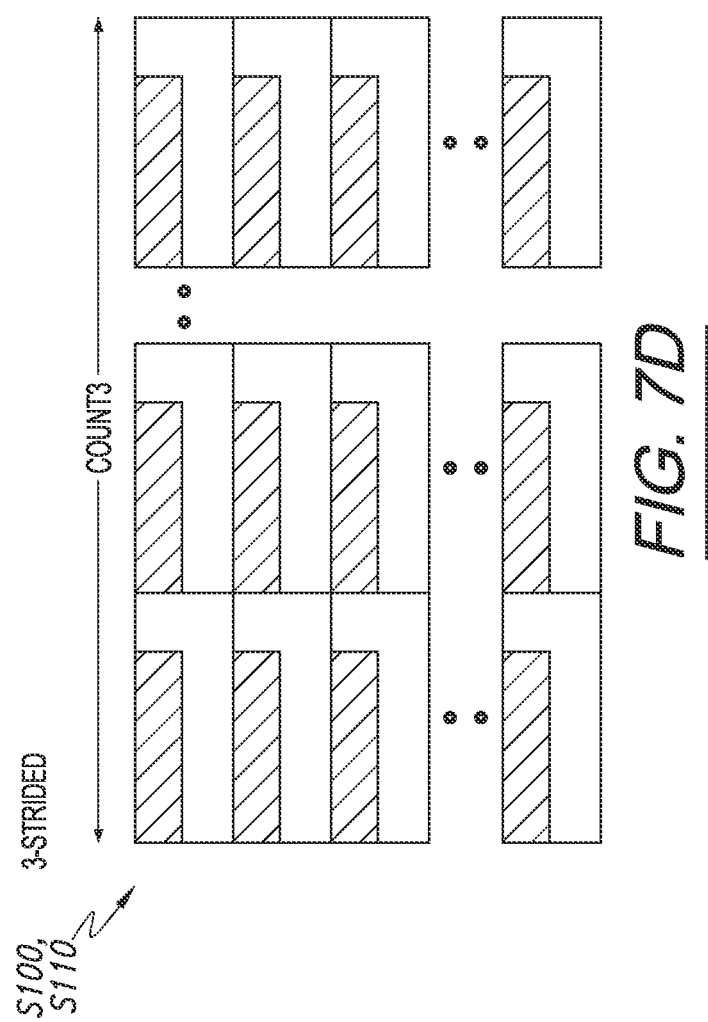

METHOD AND TENSOR TRAVERSAL ENGINE FOR STRIDED MEMORY ACCESS DURING EXECUTION OF NEURAL NETWORKS

CROSS-REFERENCE TO RELATED APPLICATIONS

This Application claims the benefit of U.S. Provisional Application No. 63/030,183, filed on 26 May 2020, which is incorporated in its entirety by this reference.

This Application is related to U.S. Pat. No. 10,474,464, filed on 3Jul 2018, and U.S. patent application Ser. No. 17/127,904, filed on 18Dec 2020, which are each incorporated in its entirety by this reference.

TECHNICAL FIELD

This invention relates generally to the field of integrated circuit design and more specifically to a new and useful system for direct memory access of input tensors in the field of integrated circuit design.

BRIEF DESCRIPTION OF THE FIGURES

FIG. 1 is a flowchart representation of a first method;

FIG. 2 is a flowchart representation of a second method;

FIG. 3 is a schematic representation of a system;

FIG. 4 is a flowchart representation of a third method;

FIG. 5 is a flowchart representation of one variation of the third method;

FIGS. 6A and 6B are schematic representations of variations of the tensor traversal engine;

FIGS. 7A, 7B, 7C, and 7D are conceptual representations of access patterns for the first method and the second method; and FIG. 8 is a schematic representation of once component of the tensor traversal engine.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIG. 1, one variation of the method S100 includes: accessing a control signal defining an initial source address, an initial destination address, a source block count, a first stride count, a first stride length, and a first stride dimension in Block S110; writing the initial source address to a source address register in Block S120; writing the source block count to a source block counter in Block S122; writing the first stride count to a first stride counter in Block S124; and writing the initial destination address to a destination address register in Block S126. The method S100 also includes, while a value of the first stride counter is greater than zero and while a value of the source block counter is greater than zero: reading a current source address from the source address register in Block S130; reading a current destination address from the destination address register in Block S132; transferring a data word stored at the current source address in the source memory component to the current destination address in the destination memory component in Block S140; incrementing the current source address in the source address register in Block S150; incrementing the current destination address in the destination address register in Block S152; and decrementing the value of the source block counter in Block S154. The method S100 further includes, while a value of the first stride counter is greater than zero and in response to the value of the source block counter equaling zero: advancing the current source address in the source address register based on the first stride length and the first stride dimension in Block S160; decrementing the value of the first stride counter in Block S170; and rewriting the source block count to the source block counter in Block S172.

As shown in FIG. 2, the method S200 for executing a strided data transfer operation from a source memory component to a destination memory component includes: writing, to a control signal register, a control signal: representing a source access pattern in the source memory component defining a first dimension and including a set of source data blocks in Block S210. The control signal includes an initial source address, an initial destination address, a first source stride length in the first dimension, and a first source stride count in the first dimension. The method S100 also includes: writing the initial source address to a source address register; writing the first source stride count to a first source stride counter; and writing the initial destination address to a destination address register in Block S220. The method S100 additionally includes transferring an initial source data block stored at the initial source address to the initial destination address in Block S230. The method S100 further includes, in response to a first current source stride count in the first source stride counter representing at least one remaining source data block in the first dimension of the source access pattern: reading a current source address from the source address register and reading a current destination address from the destination address register in Block S240; transferring a target source data block stored at the current source address to the current destination address in Block S250. The method S200 further includes, in response to completing transfer of the target source data block: advancing the source address register based on the first source stride length, the first dimension, and the current source address in Block S260; advancing the destination address register in Block S270; and decrementing the first current source stride count in the first source stride counter in Block S280.

2. Tensor Traversal Engine

As shown in FIG. 3, a tensor traversal engine 100 in a processor system 200 comprising a source memory component 210 and a destination memory component 220, the tensor traversal engine 100 including: a control signal register 110; a source address register 120; a destination address register 130; a first source stride counter 142; and control logic 160. The control signal register 110 is configured to store a control signal for a strided data transfer operation from the source memory component 210 to the destination memory component 220. The control signal: represents a source access pattern in the source memory component 210 defining a first dimension and including a set of source data blocks; and includes an initial source address, an initial destination address, a first source stride length in the first dimension, and a first source stride count in the first dimension. The source address register 120 is communicatively coupled to the control signal register 110 and configured to store a current source address. The destination address register 130 is communicatively coupled to the control signal register 110 and configured to store a current destination address. The first source stride counter is communicatively coupled to the control signal register 110 and configured to store a first current source stride count in the first dimension. The control logic 160 is configured to execute the strided data transfer operation by: writing the initial source address to the source address register 120; writing the first source stride count to the first source stride counter; and writing the initial destination address to the destination address register 130. Additionally, the control logic 160 can execute the stride data transfer operation by, in response to a first current source stride count in the first source stride counter representing at least one remaining source data block in the first dimension of the source access pattern: reading a current source address from the source address register 120; reading a current destination address from the destination address register 130; transferring the source data block stored at the current source address to the current destination address; advancing the source address register 120 based on the first source stride length, the first dimension, and the current source address; advancing the destination address register 130; and decrementing a first current source stride count in the first source stride counter.

3. Applications

Generally, the methods S100 and S200 are executed by a tensor traversal engine (hereinafter "TTE") arranged within a processor system 200 to transfer a set of non-contiguous data blocks from a source memory component 210—according to a particular source access pattern (e.g., a one- or multi-dimensional strided access pattern)—to a destination memory component 220 based on a single control signal and in order to selectively access non-contiguous data blocks from arrays, matrices, and/or tensors without requiring multiple control signals and memory access cycles of the TTE. More specifically, the TTE 100 is configured to: receive a control signal defining a source address, a destination address, and a source access pattern that specifies a source block count, a set of source stride counts, a set of source stride lengths, and a set of corresponding source surface dimensions; write the source address to a source address register 120; write the source block count to a source block counter 122; write the set of source stride counts to a corresponding set of source stride counters 140; and transfer data from the source memory component 210 to the destination memory component 220 by advancing the source address according to the source access pattern (e.g., the source stride lengths and corresponding source dimensions) and repeatedly decrementing and resetting the value of the source block counter 122 and the values of the set of source stride counters 140 in coordination with the advancing source address.

Thus, the TTE 100 can transfer strided, non-contiguous data—such as from multiple locations of a receptive field within an input tensor during execution of a convolution operation—based on a single control signal by replacing the series of control signals necessary for a standard TTE 100 to access a set of strided data (e.g., multiple distinct control signals, each specifying a source memory address corresponding to each contiguous data block) with a single control signal cooperating with a larger number of counters and registers that track the TTE's progression through the source access pattern. As a result, the TTE 100 is characterized by vastly improved transfer speeds for strided, non-contiguous data blocks between memory components within a processor system 200 at the expense of greater control signal complexity and a larger spatial footprint in the processor system 200 when compared to direct memory access engines.

In addition to accessing memory from a source memory component 210 according to a particular source access pattern, as described above, the TTE 100 can also receive a control signal specifying a particular destination storage pattern and transfer the accessed data blocks from the source memory component 210 into the destination memory component 220 according to this destination storage pattern. Therefore, the TTE 100 is configured to receive a control signal defining a destination storage pattern that specifies: a destination block count, a set of destination stride counts, a set of destination stride lengths, and a set of corresponding destination dimensions. The TTE 100 is further configured to: write the destination address to a destination address register 130; write the destination block count to a destination block counter; write the set of destination stride counts to a corresponding set of destination stride counters 150; and store data transferred from the source memory component 210, in the destination memory component 220 by advancing the destination address according to the destination access pattern (e.g., the destination stride lengths and corresponding destination dimensions) and by repeatedly decrementing and resetting the value of the destination block counter and the values of the set of destination stride counters 150 in coordination with the advancing destination address.

Thus, in addition to accessing strided, non-contiguous data blocks from the source memory component 210 and storing these data blocks within the destination memory component 220 in a linear data format, the TTE 100 can also reformat these accessed data blocks into a different strided, multi-dimensional output format, thereby reducing additional processing cycles typically utilized to reformat data for particular tensor operations.

Additionally, the TTE 100 can include hardware-implemented components configured to: the data accessed from the source memory component 210 during transfer to the destination memory component 220; change the bit length of data (e.g., compress or expand) accessed from the source memory component 210 during transfer to the destination memory component 220; transpose data accessed from the source memory component 210 during transfer to the destination memory component 220; and compress or decompress encoded data accessed from the source memory component 210 during transfer to the destination memory component 220. Furthermore, the TTE 100 can broadcast data accessed from the source memory component 210 to multiple destination memory component 220S.

3.1 Example: Convolutional Neural Networks

In one application of the TTE, a processor configured to execute convolutional neural network (hereinafter "CNN") based inference algorithms includes multiple instances of the TTE. In this application, the processor system 200 can receive a statically scheduled sequence of instructions to frequently transfer large four-dimensional tensors (representing inputs, weights, and/or outputs generated in a CNN inference) between memory components within the processor system 200. A static scheduler (further described in U.S. patent application Ser. No. 17/127,904, which is incorporated by reference) can generate a static schedule that defines multiple partitions, or chunks, of these four-dimensional tensors that the processor system 200 then transfers between memory components within the processor system 200. The TTE 100 is configured, in hardware to efficiently (in terms of power usage and speed) transfer these partitions within the processor system 200. Thus, the TTE 100 can access data according to various strided access patterns, further described below, that are commonly represented amongst these partitions of four-dimensional tensors (e.g., a 32-by-64-by-3 chunk from 224-by-224-by-3-by-1 tensor). Additionally, the TTE 100 is configured to execute additional operations inline, to reduce the load on the processor cores of the process system during execution of a CNN inference algorithm. For example, as the TTE 100 transfers data between memory components of the processor system 200, the TTE 100 can execute operations such as such as data compression, data padding, bit expansion, and data transposing.

4. Terminology

Generally, the TTE 100 is described herein as executing certain steps "in response to" particular conditions. In addition to describing an if-then logical relationship between the condition and the following steps, the phrase "in response to" as utilized herein can also describe looping or persistent conditional logic (e.g., a while loop). For example, the TTE 100 can continue to execute steps recited under the "in response to" phrase until the condition of the "in response to" phrase is no longer true.

Generally, the TTE 100 is described herein as "advancing" source addresses and/or destination address in the source address register 120 and/or the destination register respectively. As utilized herein, advancing a memory address is distinct from incrementing a memory address in that advancement can occur both forward (positive) or backward (negative) within the address space. Additionally, as utilized herein, advancing a memory address can indicate an increase or decrease of the memory address by multiple increments or steps (e.g., by skipping over intervening addresses within the address space). Likewise, phrases such as "progressing" or "stepping" may be utilized synonymously herein to indicate advancement of a memory address in a register to a different address based on the value of the prior address.

5. TTE Description

Figure 3:
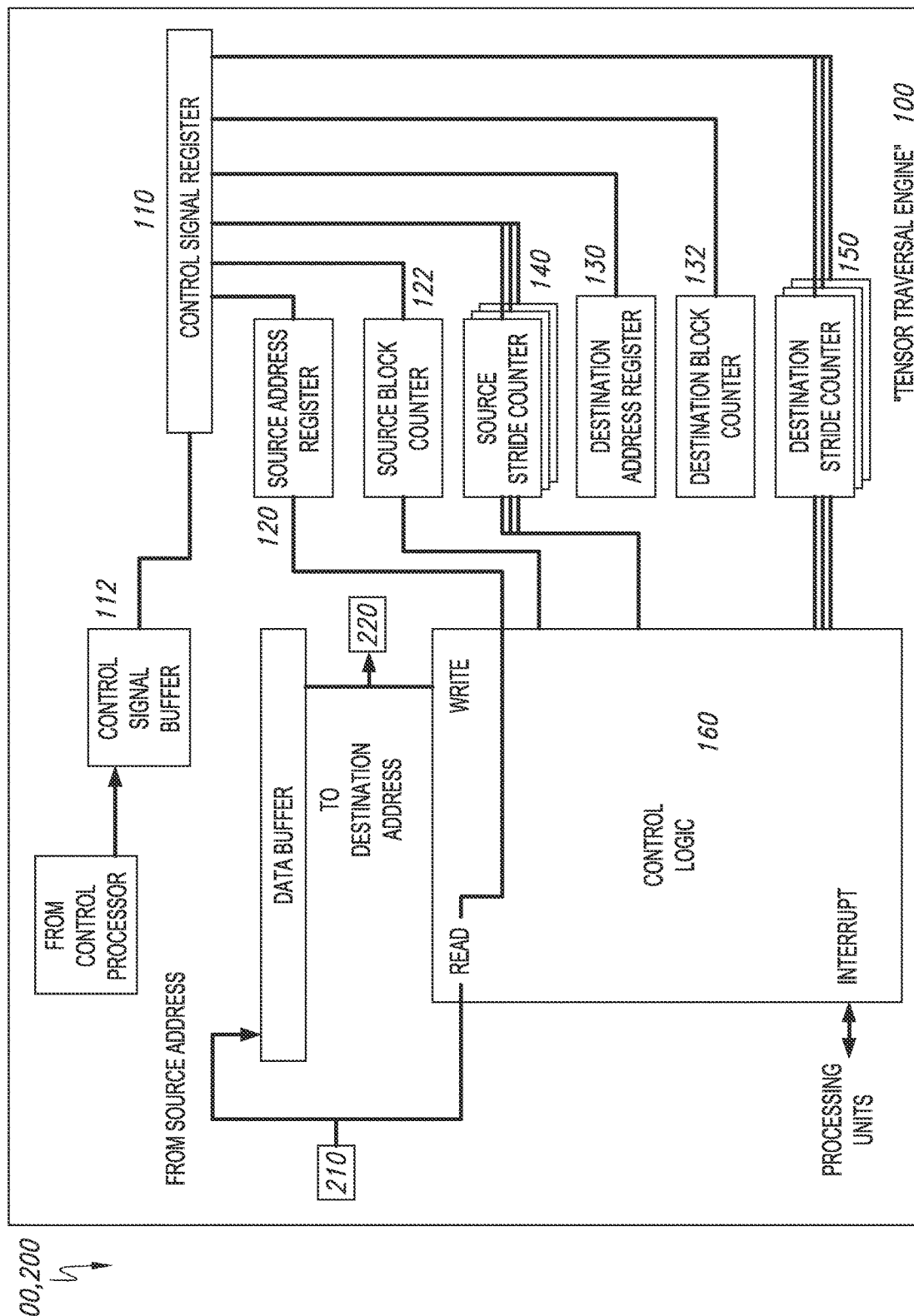

Generally, as shown in FIG. 3, the TIE 100 defines a component arranged in a processor system 200 (i.e., processor circuit), which can include multiple memory components (in a memory hierarchy), such as main memory (i.e., primary memory), shared caches (i.e., L2 memory), and individual caches (i.e., L1 memory) for each processing unit in the processor system 200, and includes: an address and/or control signal buffer 112, a control register, a data buffer 170, control logic 160, a source address register 120, a source block counter 122, a set of source stride counters 140, a destination address register 130, a destination block counter 132, and/or a set of destination stride counters 150. In some implementations, the TTE 100 can additionally include: a transpose buffer 172, a decompression logic (e.g., a Huffman decoder), and/or a bit expansion and compression logic.

Generally, the TTE 100 can include a data buffer 170 configured to store data accessed from the source memory component 210 prior to transfer to the destination memory component 220. Thus, the data buffer 170 enables the TTE 100 to asynchronously transfer data from the source memory component 210 to the destination memory component 220.

The processor system 200 can include multiple instances of the TTE, for which each instance of the TTE 100 is arranged between two memory components in the processor system 200 and is configured to transfer data between these two memory components instead of transferring data between any two memory components in the processor system 200 via the system interconnect. In one implementation, the processor system 200 includes instances of the TTE 100 arranged between main memory and L2 memory and instances of the TTE 100 arranged between L2 memory and L1 memory.

However, the TTE 100 can include fewer or additional components to those described above, as necessary, to interface with the particular processor system 200 of which the TTE 100 is a component.

The TTE 100 includes a number of "registers" and "counters." Generally, each "register" includes an array of flip flops, latches, or RAM instances configured to store a value during execution of a data transfer operation. "Registers" include "counters," which specifically store numerical values utilized for tracking the TTE's progression through a source access pattern or a destination access pattern during a data transfer operation.

5.1 Control Signal Buffer and Control Register

Generally, the TTE 100 can include a control signal buffer 112 and a control register configured to receive and store control signals input to the TTE 100 by the processor system 200. More specifically, the TTE 100 can store control signals in a control signal buffer 112, each control signal specifying details of a memory transfer operation to be executed by the TTE 100 (further described below), such as the source and destination addresses and a set of variables representing a source access pattern and a destination storage pattern, and can dequeue (in first-in-first-out order) these control signals to the control register for execution by the TTE. Thus, the TTE 100 can access—from the control signal register 110— instructions to execute a strided, non-contiguous memory access operation.

The TTE 100 can receive control signals from a control processor for dynamically scheduled processes or from a queue of statically scheduled instructions for statically scheduled processes. Additionally, each control signal can include the starting source address for the source access pattern and the starting destination address for the destination storage pattern.

5.2 Address Registers

Generally, the TTE 100 can include a source address register 120 configured to store a current address, in the source memory component 210, from which the TTE 100 accesses a data word and transfers this data word to the destination memory component 220. Likewise, the TTE 100 includes a destination address register 130 configured to store a current address, in the destination memory component 220, to which the TTE 100 can transfer a data word accessed from the source memory component 210. Thus, the TTE 100 can advance these address according the specified source access patterns and destination storage patterns, thereby maintaining a current source memory address from which the TTE 100 can access a data word and a current destination memory address to which the TTE 100 can store a data word during a data transfer operation.

5.3 Contiguous Block Counters

Generally, the TTE 100 can include: a source block counter 122, configured to count (e.g., by successively decrementing the value of the source block counter 122) the number of contiguous data words remaining for a current contiguous data block in the set of contiguous data blocks specified in the source access pattern; and a destination block counter configured to count (e.g., by successively decrementing the value of the destination block counter) the number of contiguous words remaining for each contiguous data block in the set of contiguous data blocks specified in the destination storage pattern. Additionally, after accessing or storing the current contiguous data block, the TTE 100 can reset the value of the source block counter 122 or the destination block counter to match a source block count or destination block count indicated by the control signal, in preparation for access or storage of the next contiguous data block specified by either the source access pattern or the destination storage pattern respectively. Thus, the TTE 100 can repeatedly access or store contiguous data blocks of a consistent size according to the source access pattern or the destination storage pattern.

In one implementation, the TTE 100 can include a data bus configured to transfer a single data word. For example, if the processor system 200 including the TTE 100 operates with 32-bit data words, the TTE 110 can include a 32-bit data bus in order to transfer singular data words between memory components in the processor system 200.

More specifically, the TTE 100 can access a source block count (i.e., a source block size, a source block count) for a source access pattern by accessing the control signal register 110 storing a control signal including a source block count. Additionally, the TTE 100 can transfer the source block count to a source block counter 122 via the control logic 160, to enable the TTE 100 to decrement a current source block count in the source block counter 122. Likewise, the TTE 100 can access a destination block counter (i.e., a destination block size, a destination block count) for a destination access pattern by accessing the control signal register 110 storing a control signal including a destination block count.

The TTE 100 can count the number of data words within each source data block or destination block defined by the source access pattern or the destination storage pattern respectively by executing a while loop that continuously decrements the source block counter 122 or destination block counter.

More specifically, the TTE 100 can write the source block count to the source block counter 122; and transfer a target source data block stored at the current source address to the current destination address by, in response to a current source block count in the source block counter 122 representing at least one source data word remaining in the target source data block: transferring a source data word at the current source address to the current destination address in the destination address register 130; incrementing the source address register 120; incrementing the destination address register 130; and decrementing the current source block count in the source block counter 122. Subsequently, in response to completing transfer of the target source data block, the TTE 100 can reset the source block counter 122 to the source block count stored in the control signal register 110.

Alternatively, the TTE 100 can, instead of transferring each contiguous data block directly to the destination memory component 220, transfer each source data word in a source data block into a data buffer 170 and subsequently transfer contiguous destination blocks (characterized by a destination block count different from the source block count) from the data buffer 170 to destination addresses in the destination memory component 220. In this implementation, the TTE 100 can write a destination block count (included in the control signal stored in the control signal register 110) to a destination block counter; and transfer a target destination data block from the data buffer 170 to the destination memory component 220 by, in response to a current destination block count in the destination block counter representing at least one destination word remaining in the target destination block: transferring a destination word in the data buffer 170 to the current destination address in the destination address register 130; incrementing the destination address register 130; and decrementing the current destination block count in the destination block counter. Subsequently, in response to completing transfer of the target destination block, the TTE 100 can reset the destination block counter to the destination block count stored in the control signal register 110.

5.4 Stride Counters

Generally, the TTE 100 includes a set of source stride counters 140 and/or a set of destination stride counters 150 in order to track the number of strides in each data transfer operation and in each dimension. For example, in implementations of the TTE 100 supporting data transfer of four-dimensional tensors, the TTE 100 can include up to three source stride counters 140 and up to three destination stride counters 150 in order to execute the source access pattern and the destination storage pattern respectively. Thus, upon completing access or storage of a contiguous data block (according to a value of a corresponding block counter), the TTE 100 can stride in a first dimension to a non-contiguous source or destination address and decrement a first stride counter prior to resetting the source or destination block counter and accessing or storing a subsequent contiguous data block. The TTE 100 continues this process until a value of the first stride counter is equal to zero, in which case the TTE 100 can initiate a stride in a different dimension and decrement a second stride counter or, if the TTE 100 is completing only a one-dimensional stride transfer operation, then the TTE 100 can complete the transfer operation and dequeue subsequent control signals from the control signal buffer 112.

In one implementation, the TTE 100 includes three source stride counters 140 and three destination stride counters 150 and can access strided, non-contiguous data from a four-dimensional input tensor in the source memory component 210 and reformat these data in four dimensions to store an output tensor in the destination memory component 220. In another implementation, the TTE 100 includes three source stride counters 140, but no destination stride counters 150 and, as such, can only store data in the destination memory component 220 in a linear or contiguous format but can access data according to a four-dimensional strided access pattern.

Generally, upon completing a set of strides along one dimension of a source access pattern or a destination storage pattern, the TTE 100 can advance relevant memory addresses (e.g., either the current source address or the current destination address) based on the dimension of the stride relative to the multidimensional array representing the surface at the source memory component 210 and the multidimensional array being generated in the destination memory component 220. For example, the TTE 100 can advance the current source address in the source address register 120 by a factor associated with the dimension of the stride (e.g., representing a number of memory addresses that represent a row in the source surface).

In implementations of the TTE 100 including a destination stride counter, the TTE 100 includes a control signal register 110 configured to store a control signal: representing a source access pattern in the source memory component 210 defining a first dimension an including the set of source data blocks; representing a destination storage pattern in the destination memory component 220 defining a second dimension and comprising a set of destination blocks; and including the initial source address, the initial destination address, the first source stride length in the first dimension, the first source stride count in the first dimension, a first destination stride length in the second dimension; and a first destination stride count in the second dimension. In this implementation, the TTE 100 can include control logic 160 configured to execute the strided data transfer operation by: writing an initial source address to the source address register 120; writing a first source stride count to the first source stride counter; writing an initial destination address to the destination address register 130; and writing a first destination stride count to the first destination stride counter. Additionally, the control logic 160 can continue executing the stride data transfer operation by, in response to a first current source stride count in the first source stride counter representing at least one remaining source data block in the first dimension of the source access pattern: reading the current source address from the source address register 120; reading the current destination address from the destination address register 130; transferring the source data block stored at the current source address to the current destination address; advancing the source address register 120 based on the first source stride length, the first dimension, and the current source address; advancing the destination address register 130 based on the first destination stride length and the current destination address; decrementing the first current source stride count in the first source stride counter; and decrementing a first current destination stride count in the first destination stride counter.

In yet another implementation, the TTE 100 can include a set of stride counters representing strides in a first dimension and in a second dimension (e.g., representing a two-dimensional strided source access pattern). In this implementation, the TTE 100 can first iterate through a set of strided data blocks in a first dimension; and, upon completion of this set of strided data blocks, reset a first stride counter, before striding a second dimension. More specifically, the TTE 100 can include a control register configured to store a control signal: representing the source access pattern in the source memory component 210 defining a first dimension, defining a second dimension, and including the set of source data blocks; and including the initial source address, the initial destination address, the first source stride length in the first dimension, the first source stride count in the first dimension, a second source stride length in the second dimension, and a second source stride count in the second dimension. In this implementation, the TTE 100 also includes a second source stride counter communicatively coupled to the control signal register 110 and configured to store a second current source stride count in the second dimension. Additionally, in this implementation, the TTE 100 includes control logic 160 configured to execute the strided data transfer operation by: writing the initial source address to the source address register 120; writing the first source stride count to the first source stride counter; writing the second source stride count to the second source stride counter; and writing the initial destination address to the destination address register 130. The control logic 160 is further configured to execute the strided data transfer operation by, in response to the first current source stride count in the first source stride counter representing at least one remaining source data block in the first dimension of the source access pattern and in response to a second current source stride count in the second source stride counter representing at least one remaining source data block in the second dimension of the source access pattern: reading the current source address from the source address register 120; reading the current destination address from the destination address register 130; transferring the source data block stored at the current source address to the current destination address; advancing the source address register 120 based on the second source stride length, the second dimension, and the current source address; advancing the destination address register 130; and decrementing the second current source stride count in the second source stride counter.

In this implementation, the TTE 100 continues decrementing the current source stride count in the second source stride counter until the stride counter indicates there are no additional strides remaining in the second dimension of the source access pattern. More specifically, the control logic 160 continues executing the strided data transfer operation by, in response to the first current source stride count in the first source stride counter representing at least one remaining source data block in the first dimension of the source access pattern and in response to the second current source stride count in the second source stride counter representing no remaining source data blocks in the second dimension of the source access pattern: resetting the second source stride counter to the second source stride count; advancing the source address register 120 based on the first source stride length, the first dimension, and the current source address; and decrementing the first current source stride count in the first source stride counter.

In yet another implementation, the TTE 100 can include a third dimension and execute a third while loop implemented in hardware in order to complete a set of strides in the third dimension, prior to striding in the second dimension and resetting the third stride counter for the third dimension. Upon completing the strides in the second dimension, the TTE 100 can reset the second stride counter for the second dimension and stride in the first dimension. In this manner, the TTE 100 can transfer data blocks via a three-dimensional strided source access pattern.

In yet another implementation, the TTE 100 can include a fourth dimension and execute a fourth while loop implemented in hardware in order to complete a set of strides in a fourth dimension. Thus, the TTE 100 can support any number of strided dimensions for the source access pattern or the destination storage pattern for the strided data transfer operation.

5.5 Data Buffer

Generally, the TTE 100 can include a data buffer 170 configured to store source data blocks from the source memory component 210 prior to transfer to the destination memory component 220. Thus, the TTE 100 can: transfer a source data block into the data buffer 170; store this source data block within the data buffer 170; and, in response to receiving bus access from the processor system 200; asynchronously transfer the source data block to the destination memory component 220.

More specifically, the data buffer 170 is communicatively coupled to the read and write ports of the control logic 160 enabling the data buffer 170 to receive and disperse data blocks over the communication buses of the processor system 200. The TTE, via the data buffer 170 can, therefore, transfer the target source data block stored at the current source address to the current destination address by: at a first time, loading the target source data block from the current source address into a data buffer 170; and at a second time, transferring the target source data block from the data buffer 170 to the current destination address. Consequently, the TTE 100 can avoid occupying the system bus of the processor system 200 for an extended number of consecutive cycles and also maintain high utilization of both the source memory component and the destination memory component during the strided data transfer operation.

In particular, the TTE 100 can transfer a source data block stored at a current source address in the source address register 120 to the data buffer 170 based on a current source block count in the source block counter 122 by, in response to a current source block count in the source block counter 122 representing at least one source data word remaining in the source data block: enqueuing a source data word stored at a current source address in the source address register 120 to the data buffer 170; advancing the current source address in the source address register 120; and decrementing the current source block count in the source block counter 122. Concurrently and/or asynchronously, the TTE 100 can remove data blocks from the data buffer 170 by, in response to a current destination block count in the destination block counter representing at least one destination word remaining in the destination block: dequeuing a source data word stored in the data buffer 170 to transfer the source data word to the current destination address in the destination memory component 220; incrementing the current destination address in the destination address register 130; and decrementing the destination block count in the destination block counter. Thus, the TTE 100 can execute two separate, and optionally simultaneous, while loops to asynchronously transfer data blocks to and from the data buffer 170, thereby transferring these complete data blocks from the source memory component 210 to the destination memory component 220.

5.6 Transpose Buffer

Figure 8:
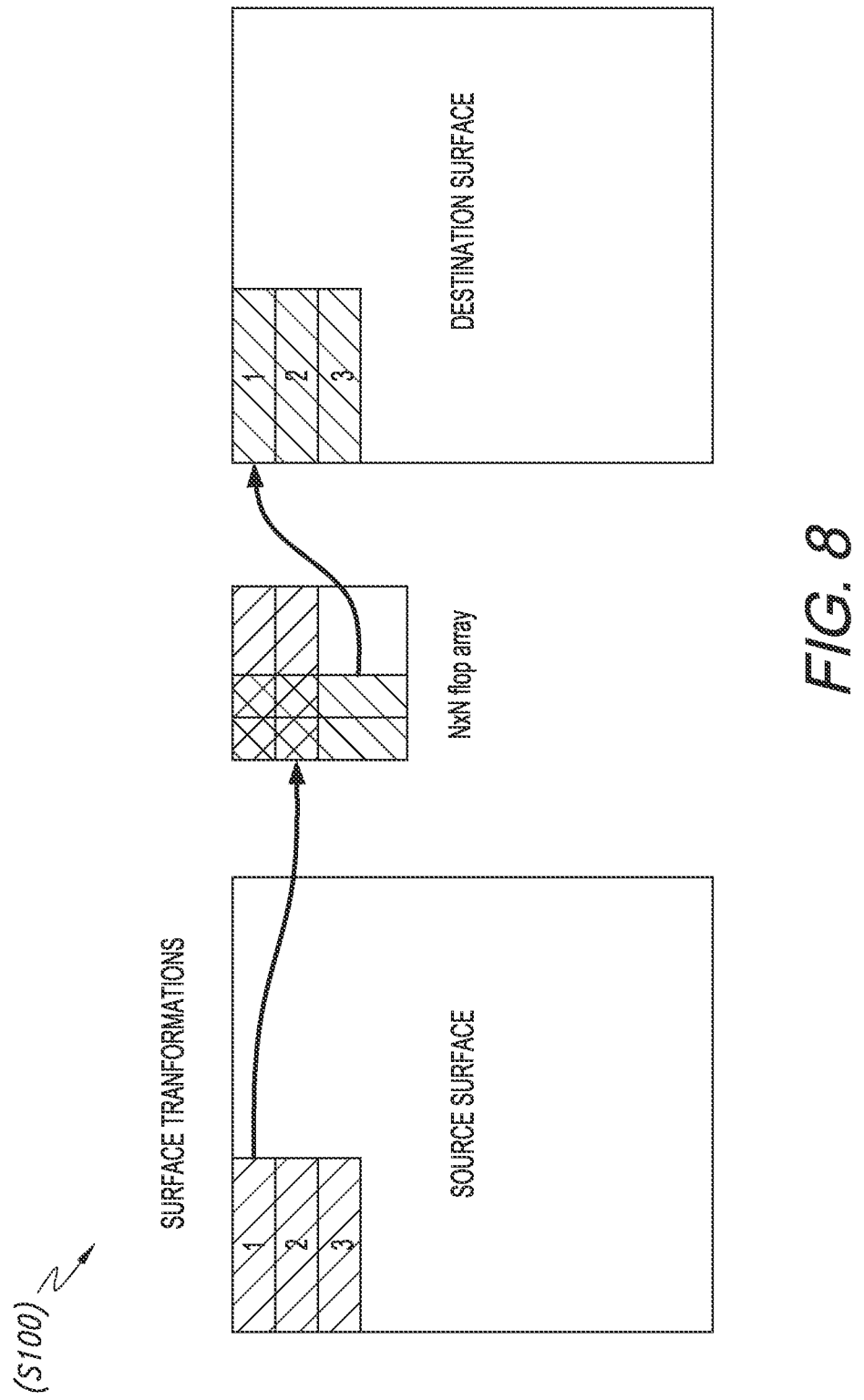

In implementations in which the TTE 100 is configured to transpose accessed data during a transfer operation, as shown in FIG. 8, the TTE 100 can include a transpose buffer 172 configured to efficiently transpose data stored in the transfer buffer after access from the source memory component 210 and prior to storage in the destination memory component 220 (e.g., by improving transfer bus bandwidth between the source memory component 210 and the transfer buffer). More specifically, the transpose buffer 172 can include a square array of flip flops, latches, or single word RAM instances, and the TTE 100 is configured to store data in the transpose buffer 172 in one orientation and access data from the transpose buffer 172 in a second orientation transposed from the first orientation, thereby transposing the data input to the transpose buffer 172. Thus, while transposing data from the source memory component 210, the TTE 100 can transfer data from the source memory component 210 to the transpose buffer 172 using the full transfer bus (e.g., 32 bytes of a 32 Byte transfer bus) as opposed to accessing individual bit-words (e.g., 1 byte of a 32 Byte transfer bus) in a specific order in order to transpose the data into the destination memory location.

In one implementation, the TTE 100 can transfer data into the transpose buffer 172 instead of into the data buffer 170, thereby enabling the transpose buffer 172 to serve multiple functions (e.g., as both a buffer enabling asynchronous data transfer and a means for transposing data during the data transfer process). More specifically, the system can transfer a target source data block stored at a source address in the source memory component 210 to a destination address in the destination memory component 220 by: loading the target source data block from the current source address into a transpose buffer 172 according to a first buffer dimension of the transpose buffer 172; and transferring the target source data block from the transpose buffer 172 according to a second buffer dimension of the transpose buffer 172.

In another implementation, the TTE 100 includes a transpose buffer 172 similarly communicatively coupled to the read and write ports of the control logic 160, thereby enabling data blocks to be directly transferred to and from the transpose buffer 172.

In these implementations of the TTE 100, the TTE 100 can support transposes between any two dimensions of a multidimensional tensor temporarily stored in the transpose buffer 172 during the strided data transfer operation. In these implementations, the TTE 100 can store a control signal specifying the particular dimensions to transpose within the multidimensional tensor. In one example, for a multidimensional tensor defining an image height dimension, an image width dimension, a color dimension, and a batch dimension, the TTE 100 can access a field in the control signal stored in the control signal register indicating a transpose between the image height dimension and the image width dimension. Alternatively, the TTE 100 can execute a transpose of the color and batch dimensions. Thus, the transpose buffer 172 is configured to transpose between any two dimensions of a multidimensional tensor.

6. Control Logic

Generally, the TTE 100 includes control logic 160 configured to execute the method S100. More specifically, the control logic 160 includes a set of logic gates, registers, and communication ports configured as a finite state machine to execute the methods S100 and S200. Thus, the control logic 160 interfaces with each of the registers and counters in the TTE 100 and interfaces with control processors, processing units, and memory components. In one implementation, the control logic 160 can include a set of ports such as DMA request, DMA acknowledge, read, write, and interrupt ports. Thus, the control logic 160 is configured to execute the strided data transfer operation by: transferring values from the control signal register 110 to other counters and registers in the TTE 100 prior to initiating a transfer cycle; reading and writing data blocks to and from the data buffer 170 and/or transpose buffer 172; calculating and coordinating the advancement of source addresses and destination addresses according to stride lengths, associated dimensions, and the indicated topology of the source access pattern and destination storage pattern (as defined by the control signal); resetting stride counters and block counters in order to track the number of strides and/or the number of contiguous blocks that have been transferred in a single transfer cycle; and, upon detecting completion of a data transfer operation, writing a subsequent control signal to the control signal register 110. Therefore, by combining these operations according to the contents of the control signal, the control signal is configured to execute Blocks of the methods S100, S200, and S300.

7. Operation

Generally, the above-described TTE, executes Blocks of the method S100, S200, S300 in order to access strided, non-contiguous data blocks of a source surface (e.g., an array, matrix, or tensor stored at a source memory component 210) and stores these data blocks at a destination memory component 220 via execution multiple transfer cycles. During each transfer cycle, the TTE 100 transfers a series of contiguous blocks along a single dimension of the strided source access pattern. Thus, in order to transfer data blocks according to a multidimensional strided access pattern or stride destination storage pattern, the TTE 100 can execute multiple nested transfer cycles.

In particular, in order to transfer a source data word stored at a current source address to a current destination address, the TTE 100 can at a first time, load the source data word from the current source address into a data buffer 170; and at a second time, transfer the source data word from the data buffer 170 to the current destination address.

More specifically, the TTE 100 can: receive and/or access a control signal; write addresses and values from the control signal to the source address register 120, the destination address register 130, the source block counter 122, the destination block counter, the set of source stride counters 140, and/or the set of destination stride counters 150; execute a series of nested while loops (e.g., transfer cycles) to access non-contiguous data blocks across the source surface according to the source access pattern; and/or execute a series of nested while loops to store these non-contiguous data blocks on a destination surface according to the destination storage pattern. Thus, the TTE 100 can, with a single control signal, complete a complex series of data block transfers that, when executed on a standard TTE, require a number of control signals equal to the number of data blocks in the source access pattern.

7.1 Control Signal Access

Generally, the TTE 100 can access a control signal and interpret instructions for a strided transfer based on the control signal. More specifically, the TTE 100 can access a control signal in order to initiate a strided transfer by writing a control signal from the control signal buffer 112 to the control register. Alternatively, the TTE 100 can receive the control signal directly from a control processor included within the processor system 200. Thus, by continually receiving control signals in the control signal buffer 112 and sequentially writing these control signals to the control register, the TTE 100 can complete a series of strided transfer operations in accordance with a scheduled task for the processor system 200.

Each control signal defines an initial source address (e.g., corresponding to the lowest address value within the source surface), an initial destination address (e.g., corresponding to the lowest address value within the destination surface), a source block count, and a set of variables defining the source access pattern and/or the destination storage pattern such as those shown in FIGS. 7A, 7B, 7C, and 7D. In one implementation, the set of variables defining the source access pattern includes a source stride count, a source stride length, and a source stride dimension (e.g., for implementations of the TTE 100 supporting multi-dimensional strides) for each stride dimension in the source access pattern. For example, for a two-strided access pattern, the control signal defines a first source stride count, a first source stride length, a first source stride dimension, a second source stride count, a second source stride length, and a second source stride dimension. Likewise, the control signal can similarly define a destination storage pattern by including a destination stride count, a destination stride length, and a destination stride dimension for stride dimension in the destination storage pattern.

In one implementation, the control signal can also include a definition of the source surface and or the destination surface by describing the representation of the source surface or destination surface in terms of the dimension of these surfaces. For example, the control signal can indicate that the source surface spans 32 data words in a first dimension, 32 data words in a second dimension, 32 data words in a third dimension, and three data words in a fourth dimension. Therefore, the TTE 100 can calculate the number of addresses to advance when executing a stride in each of the dimensions. For example, given the example source surface above, the TTE, when executing a stride of length one in the second dimension, advances the value of the source address register 120 by 32 data words minus the source block count. Likewise, given the example source surface, the TTE, when executing a stride of length two in the third dimension, advances the source address register 120 by 32×32×2=2048 data words minus the source block count.

In another implementation, the TTE 100 can access control signals that indicate the source memory component 210 and the destination memory component 220 for a strided transfer operation in implementations in which the TTE 100 is connected to multiple source memory component 210S and/or multiple destination memory component 220S. The TTE 100 can also access control signals that indicate broadcast functionality and cause the TTE 100 to transfer non-contiguous data blocks to multiple destination memory component 220S.

In yet another implementation, the TTE 100 can access control signals indicating differences between bit length of the source surface and a desired bit length of the destination surface. Thus, the TTE 100 can change the bit length (e.g., via bit expansion or bit compression) of each data word during transfer of the data word from the source memory component 210 to the destination memory component 220.

7.2 Strided Transfer

Generally, to initiate a strided transfer operation, the TTE 100 initializes counters and registers in preparation for executing a series of nested while loops based on the values of these registers. In an initialization step, the TTE: writes the initial source address to the source address register 120; writes the initial destination address to the destination address register 130; writes the source block count to the source block counter 122 (and/or the destination block count to the destination block counter); and, for each strided dimension in the source access pattern, writes the source stride count to the source stride counter.

Once the TTE 100 populates the registers and counters with the corresponding values from the control signal, the TTE 100 can access a first contiguous data block in the source access pattern and transfer this data block to the data buffer 170 of the TTE. To accomplish this, the TTE: reads a current source address from the source address register 120 (e.g., the initial source address for the first data word); accesses the data word stored at the current source address in the source memory component 210; transiently stores the data word in the data buffer 170; decrements the source block counter 122; and advances the current source address in the source address register 120 to the subsequent address. The TTE 100 can repeat this process until the value of the source block counter 122 is equal to zero or otherwise represents that a number of source data words have been transferred equal to the source block count, thereby indicating that a single data block has been accessed by the TTE. In response to the value of the source block counter 122 equaling zero, the TTE: resets the source block counter 122 to the source block count; advances a current source address in the source address register 120 by the first stride length minus the source block count; decrements the first source stride counter; and initializes a second iteration of the above-described block counter loop in order to access a second contiguous data block in the source access pattern. The TTE 100 can continue this process of accessing a contiguous data block and advancing the current source address based on the first source stride length until the value of the first source stride counter is equal to zero or otherwise indicates that all of the strides in this first dimension are complete.

In one implementation, instead of populating the source block counter 122 and/or the stride counters with values from the control signal register 110 during initialization, the TTE 100 can increment a count in the source block counter 122, the destination block counter, the set of source stride counter, and/or the set of destination stride counter and detect when this count equals the source block count, the destination block count, the source stride count, or the destination stride count respectively. Thus, in this implementation, the control logic 160 executes comparisons with the control register instead of detecting a minimum value (e.g., zero) of the count in order to identify completion of a transfer cycle.

In implementations or when executing operations in which the TTE 100 is only executing a stride in a single dimension, the TTE 100 ceases accessing the source memory component 210 upon completion of the transfer cycle. However, in implementations or operations in which the TTE 100 is executing strides in multiple dimensions, the aforementioned loops (based on the first source stride counter and the source block counter 122 respectively) are nested within additional source stride counter loops. More specifically, in response to the value of the first stride counter being equal to zero (or otherwise indicating that no strides remain in the first dimension, as described above), the TTE: resets the value of the first stride counter to the first stride count; advances the current source address in the source address register 120 according to the stride length in the second stride dimension (i.e., the first dimension of the source surface multiplied by the stride length minus the source block count); and decrements the value of a second source stride counter. Thus, the TTE 100 can execute a stride-counter-based loop for each stride dimension in the source access pattern.

More specifically, in order to advance the source address register 120 or the destination address register 130 (upon completion of a nested transfer cycle), the TTE 100 can advance the source (or destination) address register based on the first source (or destination) stride length, the dimension associated with that stride, and the current address stored within the relevant register by: calculating a source (or destination) address step size by multiplying the first source (or destination) stride length by a dimensional factor for the relevant dimension and subtracting by a source (or destination) block count; and advancing the current source (or destination) address in the source (or destination) address register by the source (or destination) address step size.

In one example in which the dimension represents a height of an input surface stored in the source memory component 210, the TTE 100 can utilize a dimensional factor for the dimension equal to the length of each row in the input surface. Therefore, if the stride length in the dimension is equal to three, the address step size is equal to the three times the row length of the inputs surface minus the contiguous block count.

For an application including a three-dimensional strided source access patter, the TTE 100 can execute the following steps in order to transfer the set of source data blocks represented by the source access pattern to the destination memory component 220. More specifically, the TTE 100 can write, to the control signal register 110, a control signal representing a source access pattern in the source memory component 210 defining a first dimension, a second dimension, and a third dimension and including a set of source data blocks. Additionally, the control signal includes: an initial source address; an initial destination address; a first source stride length in the first dimension; a first source stride count in the first dimension; a second source stride length in the second dimension; a second source stride count in the second dimension; a third source stride length in the third dimension; and a third source stride count in the third dimension. The TTE 100 can initialize the source stride counters 140 by: writing the first source stride count to the first source stride counter; writing the second source stride count to the second source stride counter; and writing the third source stride count to a third source stride counter. The TTE 100 can then execute a nested transfer cycle of the strided data transfer operation by in response to the first current source stride count in the first source stride counter representing at least one remaining source data block in the first dimension of the source access pattern, in response to the second current source stride count in the second source stride counter representing at least one remaining source data block in the second dimension of the source access pattern, and in response to a third current source stride count in the third source stride counter representing at least one remaining source data block in the third dimension of the source access pattern: reading the current source address from the source address register 120; reading the current destination address from the destination address register 130; transferring the target source data block stored at the current source address to the current destination address (e.g., via the data buffer 170); advancing the source address register 120 based on the third source stride length, the third dimension, and the current source address; advancing the destination address register 130; and decrementing the third current source stride count in the second source stride counter. The TTE 100 can then detect completion of the transfer cycle in response to the first current source stride count in the first source stride counter representing at least one remaining source data block in the first dimension of the source access pattern, in response to the second current source stride count in the second source stride counter representing at least one remaining source data blocks in the second dimension of the source access pattern, and in response to the third current source stride count in the third source stride counter representing no additional source data blocks in the third dimension of the source access pattern. The TTE 100 can then, resetting the third source stride counter to the third source stride count.

Upon resetting the third source stride counter to the third source stride count, the TTE 100 can, in response to the first current source stride count in the first source stride counter representing at least one remaining source data block in the first dimension of the source access pattern and in response to a second current source stride count in the second source stride counter representing at least one remaining source data block in the second dimension of the source access pattern: advance the source address register 120 based on the second source stride length, the second dimension, and the current source address; advance the current destination address in the destination address register 130; read the current source address from the source address register 120; read the current destination address from the destination address register 130; transfer the target source data block stored at the current source address to the current destination address; and decrement the second current source stride count in the second source stride counter. Thus, between completing transfer cycles in the third dimension of the source access pattern, the TTE 100 can execute a stride along the second dimension of the source access pattern.

After completing many nested transfer cycles along the third dimension of the source access pattern and executing a stride in the second dimension for each of those transfer cycles, the TTE 100 completes a transfer cycles along the second dimension. Thus, the TTE 100 can, in response to the first current source stride count in the first source stride counter representing at least one remaining source data block in the first dimension of the source access pattern and in response to the second current source stride count in the second source stride counter representing no remaining source data blocks in the second dimension of the source access pattern: reset the second source stride counter to the second source stride count; advance the source address register 120 based on the first source stride length, the first dimension, and the current source address; advance the current destination address in the destination address register 130; read the current source address from the source address register 120; read the current destination address from the destination address register 130; transfer the target source data block stored at the current source address to the current destination address; and decrement the first current source stride count in the first source stride counter.

Upon completion of the highest-level transfer cycle (e.g., the transfer cycle for the first dimension or the dimension which is not nested within another transfer cycle), the TTE 100 completes the strided data transfer operations and write a subsequent control signal to the control signal register 110.

In one implementation capable of executing three-dimensional strides, the TTE 100 can write, to the control signal register 110, a control signal representing a source access pattern: defining the first dimension representing an input height of an input surface; defining the second dimension representing an input width of the input surface; and defining the third dimension representing an input depth of the input surface. In this implementation, the input surface can be represented in the source memory component 210 (and in the destination memory component 220 upon completion of the transfer operation) as a multidimensional-array or array of arrays.

As the TTE 100 executes the above-described loops to access data blocks from the source surface and enqueue these data blocks in the data buffer 170, the TTE 100 can concurrently and asynchronously dequeue these data blocks from the data buffer 170 to a current destination address in the destination address register 130. The TTE 100 can then execute the same form of nested loops operating based on the destination address register 130, the destination block counter, and the set of destination stride counters 150 in order to dequeue blocks from the data buffer 170 and store these blocks on the destination surface in the destination memory component 220 according to the destination access pattern.

In one implementation, in addition to executing a strided data transfer operation characterized by a multidimensional strided access pattern, the TTE 100 can also execute strided access patterns including negative stride lengths. In this implementation, when advancing source or destination addresses based on a negative stride length, the TTE 100 can decrease the value of the address in the address register for each stride count. Furthermore, the TTE 100 can include a control signal register 110 configured to store signed binary integers to enable the control logic 160 to identify negative stride lengths in the control signal.

Thus, the TTE 100 can enqueue successive data words to the data buffer 170 via a first series of nested transfer cycles or loops operating on the set of source registers and counters according to the source access pattern and dequeue successive data words from the data buffer 170 via a second series of nested operating on the set of destination registers and counter according to the destination access pattern. More specifically, the TTE 100 can write, to the control signal register 110, a control signal: representing a source access pattern in the source memory component 210 defining the first dimension and including the set of source data blocks in the source memory component 210; and representing a destination storage pattern in the destination memory component 220 defining a second dimension and including a set of destination blocks. In this implementation, the control signal includes the initial source address, the initial destination address, the first source stride length in a first dimension, the first source stride count in the first dimension, a first destination stride length in a second dimension, and a first destination stride count in the second dimension. Additionally, the TTE 100 can initialize the strided data transfer operation by writing the first destination stride count to a first destination stride counter. Subsequently, during a transfer cycle to the destination memory component 220, the TTE 100 can, in response to the first current source stride count in the first source stride counter representing at least one at least one remaining source data block in the first dimension of the source access pattern and in response to completing transfer of the target source data block, advance the destination address register 130 based on the first destination stride length and the current destination address and decrement a current destination stride count in the first destination stride counter.

In another implementation, the TTE 100 can execute a separate set of nest transfer cycles in order to execute a multidimensional strided transfer from the data buffer 170 to the destination memory component 220, such that the source data blocks are rearranged into a distinctly patterned strided destination storage pattern upon transfer to the destination memory component 220.

In yet another implementation, the TTE 100 can generate and/or introduce a predetermined (e.g., by the control signal) constant pattern of values for inclusion in the destination surface (i.e., output surface). In this implementation, the TTE 100 can selectively fill regions of the data buffer 170 with the predetermined constant value or with a predetermined constant pattern. Thus, the TTE 100 can transfer these constant or pattern values from the data buffer 170 to the destination storage during the set of destination transfer cycles.

7.2.1 Dimension Mapping

In one implementation, the TTE 100 can execute a dimensional transformation between a source surface and a destination surface in order to rotate the representation of the source surface upon storage in the destination surface. In this implementation, the TTE 100 can modify the order of the nested loops and instead advance the current destination address over a second dimension before advancing in a first dimension, thereby transforming the first dimension of the source surface to the second dimension of the destination surface. In this manner, the TTE 100 can modify the dimensional mapping of the surface during transfer between memory components in the processor system 200.

Alternatively, the TTE 100 can map dimensions from the input surface to the destination surface by executing a set of transpose operations and maintaining linear destination address incrementation. For example, the TTE 100 can receive a control signal specifying a particular source access pattern (indicating strides in various dimensions) and also specifying transpose operations for specific data blocks transferred according to the source access pattern. Thus, by modifying the source access pattern and selectively transposing data blocks from the source memory component 210, the TTE 100 can modify the dimensions of the destination surface in comparison to the source surface.

7.3 Padding

In one implementation, the TTE 100 can selectively add padding along specified edges of the destination surface, at a specified depth, and of a specified type. More specifically, the TTE 100 can selectively generate data words indicating the appropriate padding values in accordance with the values stored in the destination counters and registers. More specifically, the TTE 100 can: at a first time, load the target source data block from the current source address into a data buffer 170; at a second time, transfer the target source data block from the data buffer 170 to the current destination address; and append padding data to the target source data block in the data buffer 170.

For example, in response to reading particular values corresponding to edges of the destination surface (e.g., a destination stride counter value of zero indicating a contiguous block on the edge of the destination surface), the TTE 100 can substitute a data word representing a padding value instead of dequeuing a data word from the data buffer 170. Thus, the TTE 100 can add padding to the destination surface in order to further improve the efficiency of convolution operations of the processor system 200. In this implementation, the TTE 100 can execute multiple types of padding including zero padding, replication padding, and reflection padding.

8. Custom Pattern Variation

Generally, the TTE 100 can be configured to execute a custom data transfer operation (e.g., to transfer a non-strided and non-contiguous set of source data blocks) from a source memory component 210 to a destination memory component 220. In this variation, the TTE 100 can reference a source pointer array to identify the memory address and block counts for each source data block in the set of source data blocks. The TTE 100 can also include specific counters, address registers, and/or buffers in order to process this pointer array in order to access the reference memory addresses and source block lengths for each source data block in the set of source data blocks. The TTE 100 can then iterate through the source pointer array and transfer each contiguous source data block to the data buffer 170 and, concurrently or asynchronously, transfer each source data block to a series of destination blocks in the destination memory component 220. Thus, in addition to specific strided source access patterns, the TTE 100 can transfer any set of non-contiguous blocks from a source memory component 210 to a destination memory component 220 based on a reference to a source pointer array, thereby further improving the flexibility of the TTE 100 at the expensive of only a few additional hardware components.

In this variation, the TTE 100 can write a control signal to the control signal register 110 that specifies a type of transfer operation (e.g., a strided data transfer operation or a custom data transfer operation). Additionally or alternatively, the TTE 100 can write a control signal to the control signal register 110 that separately specifies the source access pattern and the destination storage pattern, such that the TTE 100 can execute hybrid data transfer operations (e.g., by transferring a set of source data blocks arranged according to a custom source access pattern to a set of destination blocks arranged according to a strided destination access pattern or by transferring a set of source data blocks arranged according to a strided source access pattern to a set of destination blocks arranged according to a custom destination access pattern.). Thus, a user or application may specify, via control signal issued to the TTE 100 any combination of source access patterns and destination storage patterns for a data transfer operation between a source memory component 210 and a destination memory component 220.

Additionally, the TTE 100 can execute a custom data transfer operation for subset of dimensions of an input surface while executing a strided data transfer operation for other dimensions of the input surface. Thus, the TTE 100 can execute hybrid transfer operation for which the TTE 100 executes a strided access pattern in one dimension (and iterates through a transfer cycle to transfer strided source data blocks in this dimension), while iterating through a pointer array defining a custom source access pattern in a second dimension. Thus, a user or application of the TTE 100 can balance the advantages and disadvantages of the of the strided access pattern and the custom access pattern on a dimension-by-dimension basis.

8.1 Custom Pattern Variation: Method

Figure 4:
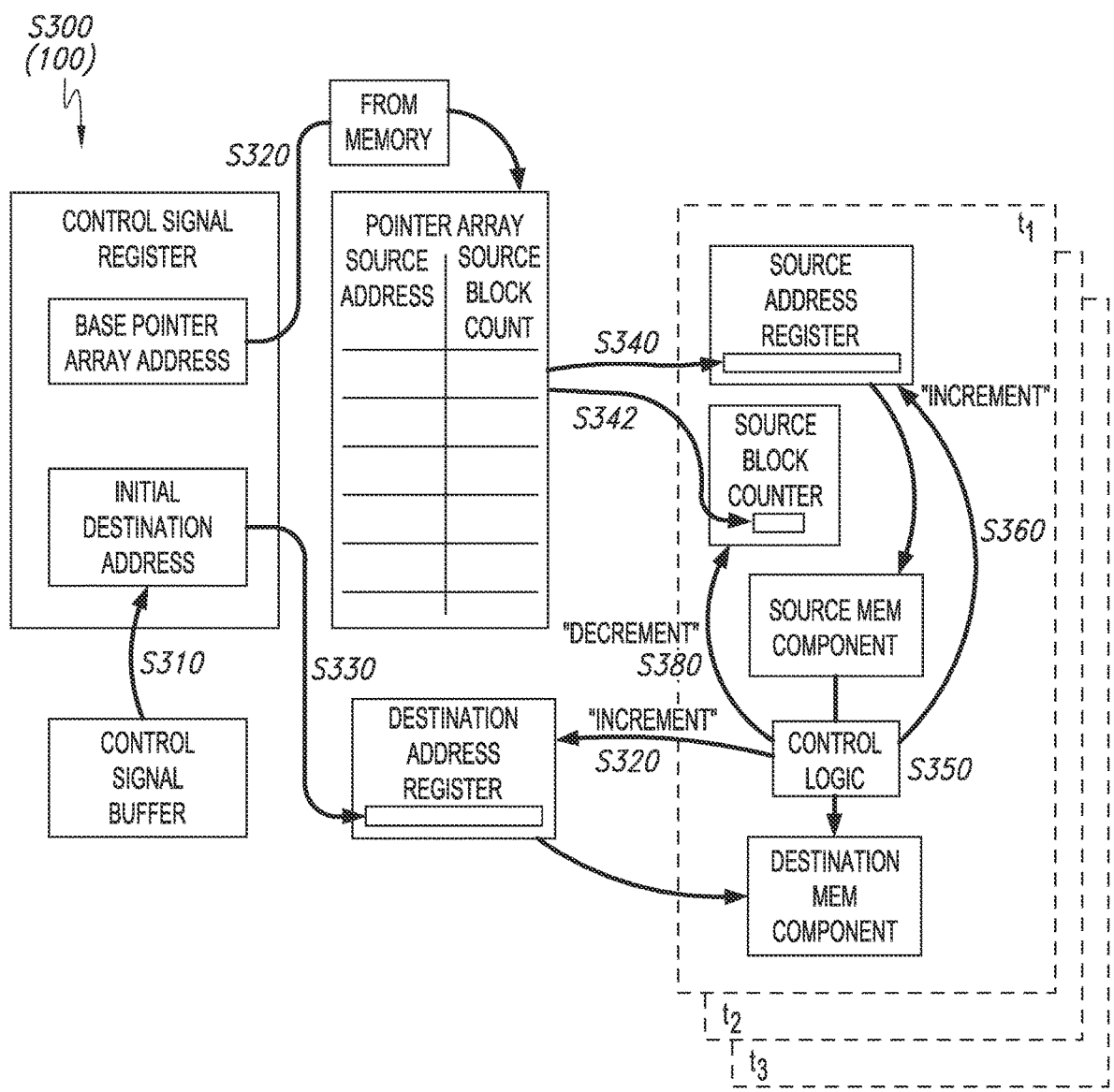

As shown in FIG. 4, a method S300 for executing a data transfer operation from a source memory component 210 to a destination memory component 220 includes: writing, to a control signal register 110, a control signal representing a custom source access pattern comprising a set of source data blocks in the source memory component 210, the control signal including a base pointer array address and an initial destination address in Block S310; accessing a pointer array at the base pointer array address, the pointer array comprising a set of pointer array elements, each pointer array element representing a source data block in the set of source data blocks and including a source address for the source data block and a source block count for the source data block in Block S320; writing the initial destination address to a destination address register 130 in Blocks S330. The method S300 also includes, for each pointer array element in the set of pointer array elements: writing the source address for the source data block to a source address register 120 in Block S340; writing the source block count for the source data block to a source block counter 122 in Block S342. The method S300 further includes, for each pointer array element in the set of pointer array elements and in response to a current source block count in the source block counter 122 representing at least one source data word remaining in the source data block: transferring a source data word stored at a current source address in the source address register 120 to a current destination address in the destination address register 130 in Block S350; incrementing the current source address in the source address register 120 in Block S360; incrementing the current destination address in the destination address register 130 in Block S370; and decrementing the current source block count in the source block counter 122 in Block S380.

Figure 5:
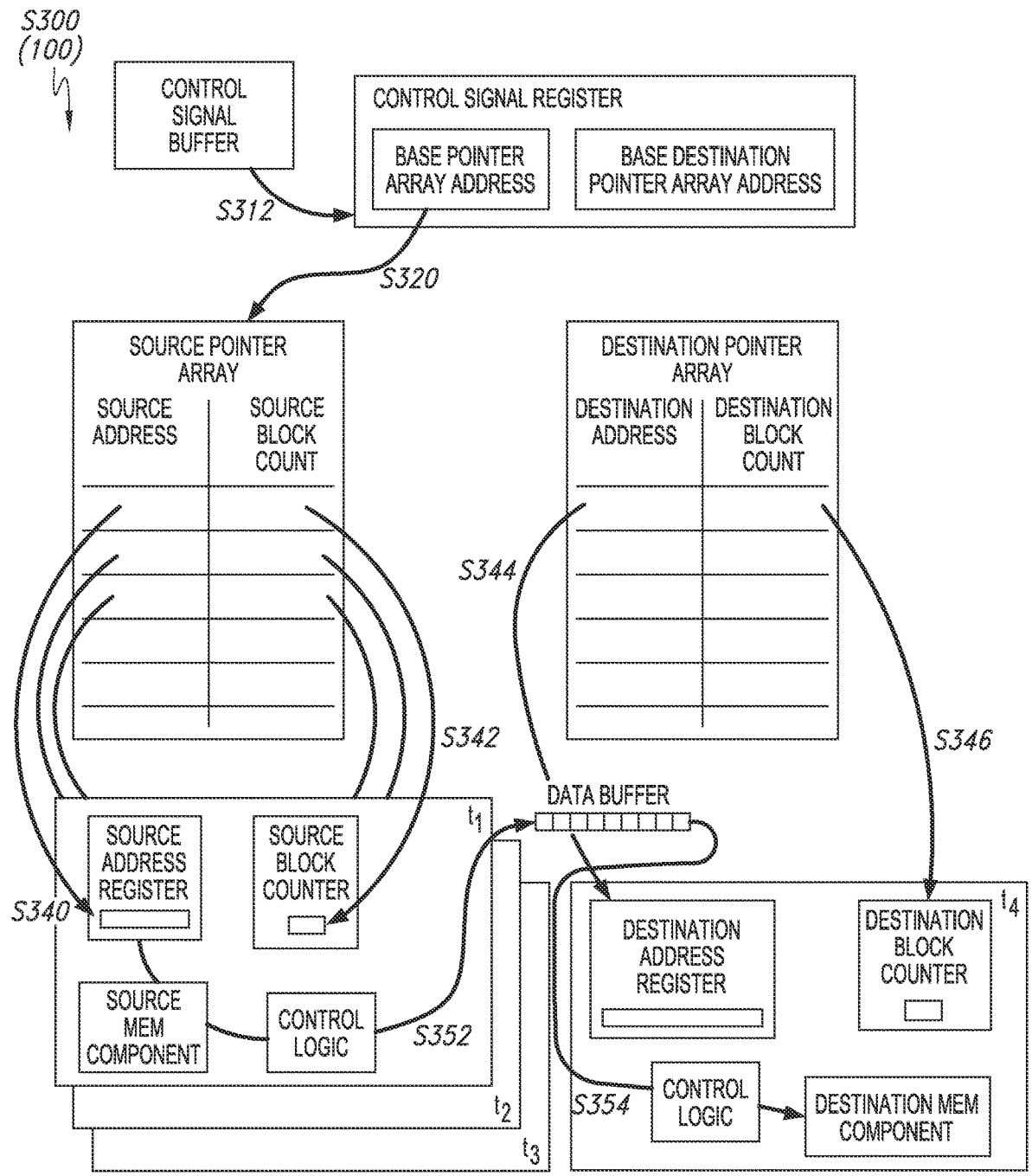

As shown in FIG. 5, one variation of the method S300 includes: writing, to a control signal register 110, a control signal representing a custom source access pattern comprising a set of source data blocks in the source memory component 210 representing a custom destination storage pattern comprising a set of destination blocks in the destination memory component 220, and including a base source pointer array address and a base destination pointer array address in Block S312; accessing a source pointer array at the base source pointer array address, the source pointer array comprising a set of source pointer array elements, each source pointer array element: representing a source data block in the set of source data blocks and including a source address for the source data block and a source block count for the source data block in Block S300. This variation of the method S300 also includes, for each source pointer array element in the set of source pointer array elements: writing the source address for the source data block represented by the source pointer array element to a source address register 120 in Block S340; writing the source block count for the source data block represented by the source pointer array element to a source block counter 122 in Block S342; transferring the source data block at a current source address in the source address register 120 to a data buffer 170 based on a current source block count in the source block counter 122 in Block S352. This variation of the method S300 additionally includes, accessing a destination pointer array at the base destination pointer array address, the destination pointer array comprising a set of destination pointer array elements, each destination pointer array element: representing a destination block in the set of destination blocks and including a destination address for the destination block and a destination block count for the destination data block in Block S322. This variation of the method S300 further includes, for each destination pointer array element in the set of destination pointer array elements: writing the destination address for the destination block represented by the destination pointer array element to a destination address register 130 in Block S344; writing the destination block count for the destination data block represented by the destination pointer array element to a destination block counter in Block S346; and transferring a source data block stored in the data buffer 170 to a current destination address in the destination address register 130 based on a current destination block count in the destination block counter in Block S354.

8.2 Custom Pattern Variation: System

Figure 6A:
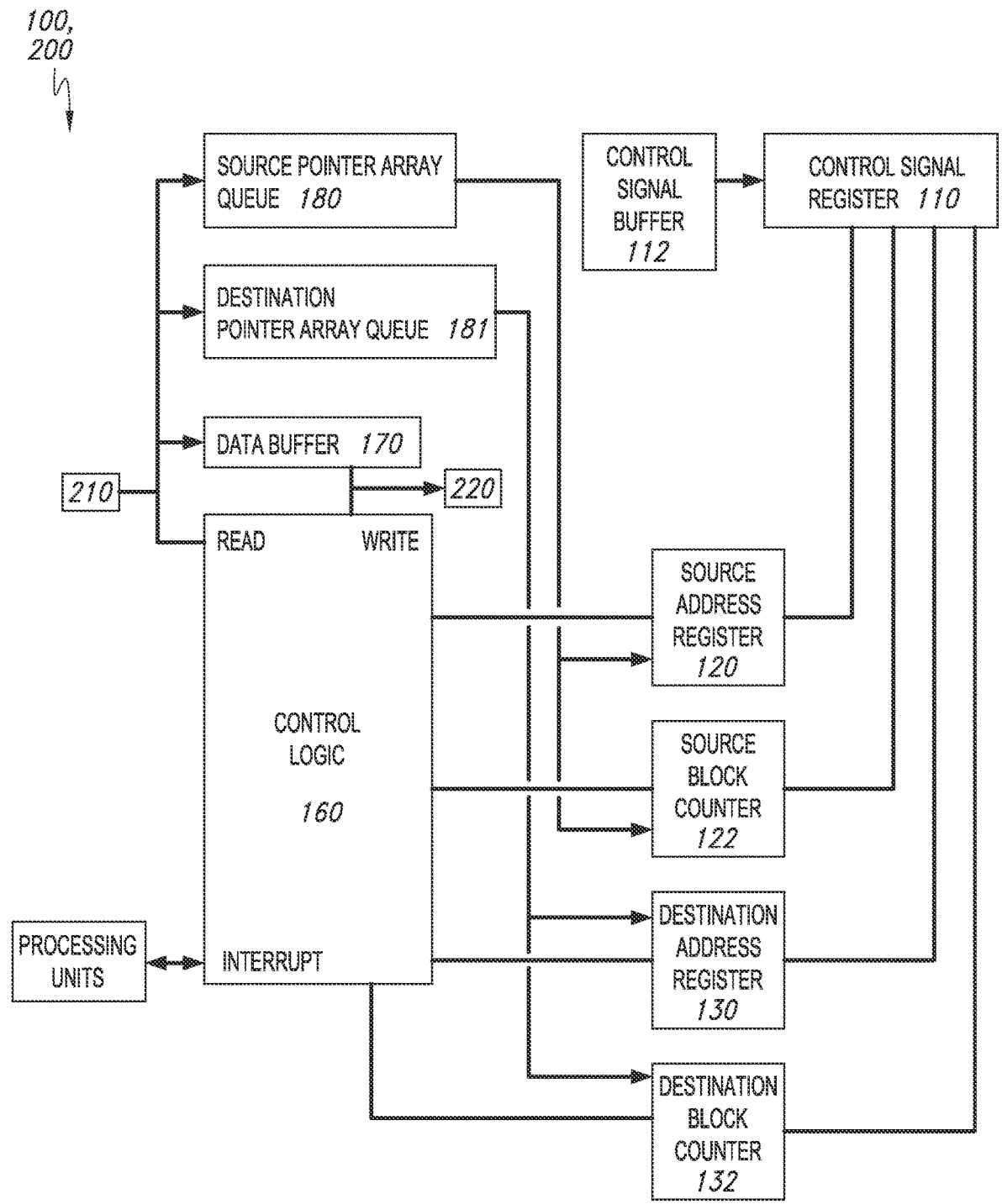
Figure 6B:
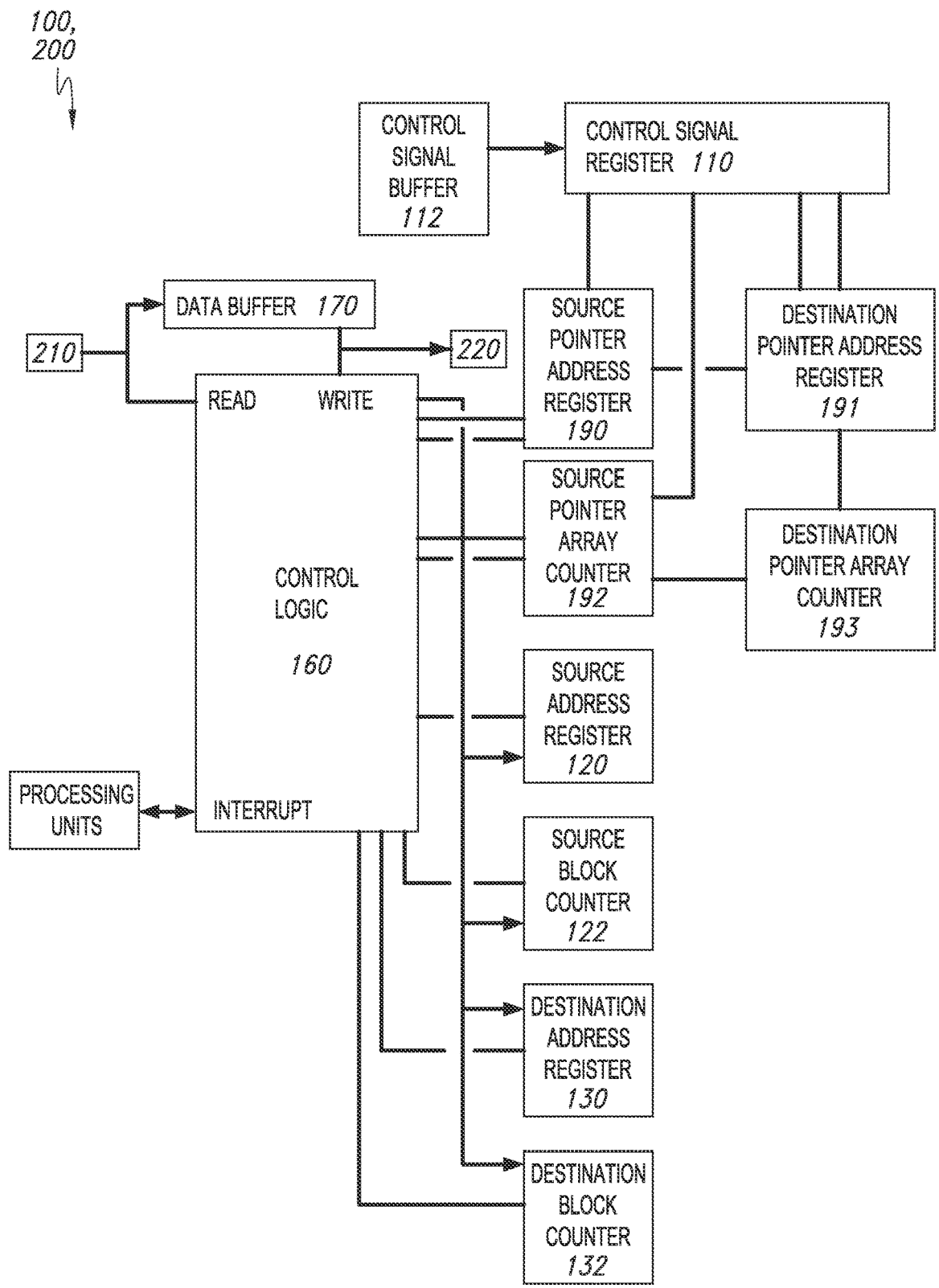

As shown in FIGS. 6A and 6B tensor traversal engine in a processor system 200 comprising a source memory component 210 and a destination memory component 220, the tensor traversal engine including: a control signal register 110 configured to store a control signal for a data transfer operation from the source memory component 210 to the destination memory component 220, the control signal: representing a custom source access pattern comprising a set of source data blocks in the source memory component 210; representing a custom destination storage pattern comprising a set of destination blocks in the destination memory component 220; and including a base source pointer array address and a base destination pointer array address. The TTE 100 also includes: a source address register 120; a source block counter 122; a destination address register 130; a destination block counter 132; a data buffer 170. The TTE 100 further includes control logic 160 communicatively coupled to: the control signal register 110; the source address register 120; the source block counter 122; the destination address register 130; and the destination block counter.

8.3 Pointer Arrays

Generally, the custom pattern variation reference source and/or destination pointer array that define a custom source access patter and/or a custom destination access pattern respectively. The processor system 200 can store a pointer array in a region of the source memory component 210 in a region of the destination memory component 220, or in a separate memory component of the processor system 200. The source pointer array and the destination pointer array include a set of pointer array elements, each pointer array element including a source address (for a source data block) or a destination address (for a destination address) as well as a block length (expressed as a number of data words) of the corresponding source or destination data block. Thus, by accessing a pointer array element in a source or destination pointer array, the TTE 100 can identify both the location (i.e., a source address or a destination address) and a size of each contiguous data block in the transfer pattern.

In one implementation, the TTE 100 can access a source or destination pointer array that stores relative source or destination addresses in order to compress the size of the source or destination pointer array. For example, the TTE 100 can access a source or destination pointer array including a source address defined relative to the initial source address of the pointer array or the base address of the pointer array itself.

8.4 Pointer Array Queue

As show in FIG. 6A, in one implementation of the custom pattern variation of the TTE 100, the TTE 100 can iterate through the source pointer array and the destination pointer array by loading these pointer arrays into a corresponding queue (e.g., within a memory device included in the TTE) and dequeuing the pointer array elements from these pointer arrays in order to iterate through the pointer arrays. This implementation enables the TTE 100 to fetch the entire pointer array in a single step as opposed to multiple separate accesses at the expense of increased hardware overhead.

More specifically, the TTE 100 can include a control signal register 110 configured to store a control signal: representing the custom source access pattern including the set of source data blocks in the source memory component 210; representing the custom destination storage pattern including the set of destination blocks in the destination memory component 220; and including the base source pointer array address, a source pointer array length, the base destination pointer array address, and a destination pointer array length. The TTE 100 can also further include: a source pointer array queue 180 configured to store a set of source pointer array elements characterized by the source pointer array length; and a destination pointer array queue 181 configured to store a set of destination pointer array elements characterized by the destination pointer array length. Thus, in this implementation, the TTE 100 can access the pointer array at the base pointer array address by loading the pointer array into a pointer array queue 180 based on the base pointer address and the pointer array length.

In order to execute the custom data transfer operation based on the pointer array queue 180, the TTE 100 can: read the source address for the source data block from a first pointer array element in the pointer array queue 180; and write the source address for the source data block to the source address register 120; read the source block count for the source data block from the first pointer array element in the pointer array queue 180; and write the source block count for the source data block to the source block counter 122; and for each pointer array element in the set of pointer array elements: in response to writing the source address for the source data block to the source address register 120 and in response to writing the source block count for the source data block to the source block counter 122, dequeue the first pointer array element from the pointer array queue 180. Likewise, the TTE 100 can execute a similar series of steps for a destination pointer array queue 181.

85 Pointer Array Address Register and Counter

As show in FIG. 6B, the custom pattern version of the TTE, can utilize a pointer address register 190 and a pointer array counter 192 to track the progress of the TTE 100 as it iterates through the source or destination pointer arrays. In this implementation, the hardware overhead is reduced, as only a register and counter are included for each of the source pointer array and the destination pointer array). Thus, the TTE 100 can iterate through the source pointer array and/or the destination pointer array by incrementing the source/destination pointer address register 191 and a source/destination pointer array counter 193.

More specifically, the TTE 100 can include a control signal register 110 configured to store a control signal: representing the custom source access pattern comprising the set of source data blocks in the source memory component 210; representing the custom destination storage pattern comprising the set of destination blocks in the destination memory component 220; and including the base source pointer array address, a source pointer array length, the base destination pointer array address, and a destination pointer array length. The TTE 100 can further include: a source pointer address register 190; a source pointer array counter 192; a destination pointer address register 191; and a destination pointer array counter 193.

Additionally, in this implementation, in order to iterate through the source and/or destination pointer array. The control logic 160 of the TTE 100 can is configured to: write the base source pointer array address to the source pointer address register 190; write the source pointer array length to the source pointer array counter 192; write the base destination pointer array address to the destination pointer address register 191; and write the destination pointer array length to the destination pointer array counter 193. In this implementation of the TTE, the control logic 160 is also configured to, in response to a current source pointer array count in the source pointer array counter 192 representing at least one source pointer array element remaining in the source pointer array: read a current source pointer array address in the source pointer address register 190; read the source address for a source data block in the set of source data blocks from the source pointer array element at the current source pointer array address; write the source address for the source data block to the source address register 120; transfer the source data block at the source address for the source data block to the data buffer 170; increment the current source pointer array address in the source pointer address register 190; and decrement the current source pointer array count in the source pointer array counter 192. In this implementation, the TTE 100 includes control logic 160 additionally configured to, in response to a current destination pointer array count in the destination pointer array counter 193 representing at least one destination pointer array element remaining in the destination pointer array: read a current destination pointer array address in the destination pointer address register 191; read the destination address for a destination block in the set of destination blocks from the destination pointer array element at the current destination pointer array address; write the destination address for the destination block to the destination address register 130; transfer the source data block in the data buffer 170 to the destination address in the destination component; increment the current destination pointer array address in the destination pointer address register 191; and decrement the current destination pointer array count in the destination pointer array counter 193.

In further detail, the TTE 100 can write the source address for the source data block to the source address register 120 by: reading a current pointer array address in the pointer address register; reading the source address for the source data block from the pointer array element at the current pointer array address; and writing the source address for the source data block to the source address register 120. Additionally, the TTE 100 can write the source block count for the source data block to the source block counter 122 by: reading the current pointer array address in the pointer address register; reading the source block count for the source data block from the pointer array element at the current pointer array address; and writing the source block count for the source data block to the source block counter 122. The TTE 100 can then, for each pointer array element in the set of pointer array elements: in response to writing the source address for the source data block to the source address register 120 and in response to writing the source block count for the source data block to the source block counter 122, incrementing the current pointer array address in the pointer address register.

Thus, in this implementation, the TTE 100 can access the pointer array at the base pointer array address by writing the base pointer array address to a pointer address register and writing the pointer array length to a pointer array counter 192 prior to executing a while loop to repeatedly access consecutive pointer array elements from the pointer array.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for executing a data transfer operation from a source memory component to a destination memory component comprising:
    writing, to a control signal register, a control signal representing a custom source access pattern comprising a set of source data blocks in the source memory component, the control signal comprising:
        a base pointer array address; and
        an initial destination address;
    accessing a pointer array at the base pointer array address, the pointer array comprising a set of pointer array elements, each pointer array element:
        representing a source data block in the set of source data blocks; and
        comprising:
            a source address for the source data block; and
            a source block length for the source data block;
    writing the initial destination address to a destination address register; and
    for each pointer array element in the set of pointer array elements:
        writing the source address for the source data block to a source address register;
        writing the source block length for the source data block to a source block counter; and
        in response to a current source block count in the source block counter representing at least one source data word remaining in the source data block:
            transferring a source data word stored at a current source address in the source address register to a current destination address in the destination address register;
            incrementing the current source address in the source address register;
            incrementing the current destination address in the destination address register; and
            decrementing the current source block count in the source block counter.

2. The method of claim 1, wherein writing to the control signal register comprises writing, to the control signal register the control signal representing the custom source access pattern comprising the set of source data blocks in the source memory component, the control signal comprising:
    the base pointer array address;
    a pointer array length; and
    the initial destination address.

3. The method of claim 2, wherein accessing the pointer array at the base pointer array address comprises loading the pointer array into a pointer array queue based on the base pointer address and the pointer array length.

4. The method of claim 3:
    wherein writing the source address for the source data block to the source address register comprises:
        reading the source address for the source data block from a first pointer array element in the pointer array queue; and
        writing the source address for the source data block to the source address register;
    wherein writing the source block length for the source data block to the source block counter comprises:
        reading the source block length for the source data block from the first pointer array element in the pointer array queue; and
        writing the source block length for the source data block to the source block counter; and
    further comprising, for each pointer array element in the set of pointer array elements, in response to writing the source address for the source data block to the source address register and, in response to writing the source block length for the source data block to the source block counter, dequeuing the first pointer array element from the pointer array queue.

5. The method of claim 1, wherein accessing the pointer array at the base pointer array address comprises:
    writing the base pointer array address to a pointer address register; and
    writing the pointer array length to a pointer array counter.

6. The method of claim 5:
    wherein writing the source address for the source data block to the source address register comprises:
        reading a current pointer array address in the pointer address register;
        reading the source address for the source data block from the pointer array element at the current pointer array address; and
        writing the source address for the source data block to the source address register;
    wherein writing the source block length for the source data block to the source block counter comprises:
        reading the current pointer array address in the pointer address register;
        reading the source block length for the source data block from the pointer array element at the current pointer array address; and
        writing the source block length for the source data block to the source block counter; and
    further comprising, for each pointer array element in the set of pointer array elements, in response to writing the source address for the source data block to the source address register and, in response to writing the source block length for the source data block to the source block counter, incrementing the current pointer array address in the pointer address register.

7. The method of claim 1, wherein transferring a source data word stored at a current source address in the source address register to a current destination address in the destination address register comprises:
    at a first time, loading the source data word from the current source address into a transpose buffer according to a first buffer dimension of the transpose buffer; and
    at a second time, transferring the source data word from the transpose buffer according to a second buffer dimension of the transpose buffer.

8. The method of claim 1, wherein transferring the source data word stored at the current source address to the current destination address comprises:
at a first time, loading the source data word from the current source address into a data buffer; and
at a second time, transferring the source data word from the data buffer to the current destination address.

9. The method of claim 1, wherein writing to the control signal register comprises writing, to the control signal register, the control signal representing the custom source access pattern comprising the set of source data blocks in the source memory component, the control signal:
representing a destination storage pattern in the destination memory component:
defining a first dimension; and
comprising a set of destination blocks; and
comprising:
the base pointer array address;
the initial destination address; and
a first destination stride length in the first dimension;
in response to the current source block count in the source block counter representing no source data words remaining in the source data block, advancing the current destination address in the destination address register based on the first destination stride length and the current destination address.

10. A method for executing a data transfer operation from a source memory component to a destination memory component comprising:
writing, to a control signal register, a control signal:
representing a custom source access pattern comprising a set of source data blocks in the source memory component;
representing a custom destination storage pattern comprising a set of destination blocks in the destination memory component; and
comprising:
a base source pointer array address; and
a base destination pointer array address;
accessing a source pointer array at the base source pointer array address, the source pointer array comprising a set of source pointer array elements, each source pointer array element:
representing a source data block in the set of source data blocks; and
comprising:
a source address for the source data block; and
a source block length for the source data block;
for each source pointer array element in the set of source pointer array elements:
writing the source address for the source data block represented by the source pointer array element to a source address register;
writing the source block length for the source data block represented by the source pointer array element to a source block counter; and
transferring the source data block at a current source address in the source address register to a data buffer based on a current source block length in the source block counter, and in response to the current source block count in the source block counter representing at least one source data word remaining in the source data block:
enqueuing a source data word stored at a current source address in the source address register to the data buffer;
incrementing the current source address in the source address register; and
decrementing the current source block count in the source block counter;
accessing a destination pointer array at the base destination pointer array address, the destination pointer array comprising a set of destination pointer array elements, each destination pointer array element:
representing a destination block in the set of destination blocks; and
comprising:
a destination address for the destination block; and
a destination block length for the destination data block; and
for each destination pointer array element in the set of destination pointer array elements:
writing the destination address for the destination block represented by the destination pointer array element to a destination address register;
writing the destination block length for the destination data block represented by the destination pointer array element to a destination block counter; and
transferring a source data block stored in the data buffer to a current destination address in the destination address register based on a current destination block length in the destination block counter.

11. The method of claim 10, wherein transferring the source data block stored in the data buffer to the current destination address in the destination address register based on the current destination block length in the destination block counter comprises, in response to the current destination block count in the destination block counter representing at least one destination word remaining in the destination block:
dequeuing a source data word stored in the data buffer to transfer the source data word to the current destination address in the destination memory component;
incrementing the current destination address in the destination address register; and
decrementing the destination block count in the destination block counter.

12. A tensor traversal engine in a processor system comprising a source memory component and a destination memory component, the tensor traversal engine comprising:
a control signal register configured to store a control signal for a data transfer operation from the source memory component to the destination memory component, the control signal:
representing a custom source access pattern comprising a set of source data blocks in the source memory component;
representing a custom destination storage pattern comprising a set of destination blocks in the destination memory component; and
comprising:
a base source pointer array address; and
a base destination pointer array address;
a source address register;
a source block counter;
a source pointer address register;
a source pointer array counter;
a destination address register;
a destination block counter;
a data buffer; and
control logic communicatively coupled to:
the control signal register;
the source address register;

the source block counter;
the source pointer address register;
the source pointer array counter;
the destination address register; and
the destination block counter; and
wherein the control logic is configured to, in response to a current source pointer array count in the source pointer array counter representing at least one source pointer array element remaining in the source pointer array:
read a current source pointer array address in the source pointer address register;
read the source address for a source data block in the set of source data blocks from the source pointer array element at the current source pointer array address;
write the source address for the source data block to the source address register;
transfer the source data block at the source address for the source data block to the data buffer;
increment the current source pointer array address in the source pointer address register; and
decrement the current source pointer array count in the source pointer array counter.

13. The tensor traversal engine of claim 12, wherein the control logic is configured to execute the data transfer operation by:
accessing a source pointer array at the base source pointer array address, the source pointer array comprising a set of source pointer array elements, each source pointer array element:
representing a source data block in the set of source data blocks; and
comprising:
a source address for the source data block; and
a source block length for the source data block;
for each source pointer array element in the set of source pointer array elements:
writing the source address for the source data block represented by the source pointer array element to the source address register;
writing the source block length for the source data block represented by the source pointer array element to the source block counter; and
transferring the source data block stored at a current source address in the source address register to a data buffer based on a current source block length in the source block counter;
accessing a destination pointer array at the base destination pointer array address, the destination pointer array comprising a set of destination pointer array elements, each destination pointer array element:
representing a destination block in the set of destination blocks; and
comprising:
a destination address for the destination block; and
a destination block length for the destination data block; and
for each destination pointer array element in the set of destination pointer array elements:
writing the destination address for the destination block represented by the destination pointer array element to the destination address register;
writing the destination block length for the destination data block represented by the destination pointer array element to the destination block counter; and
transferring the source block stored in the data buffer to a current destination address in the destination address register based on a current destination block length in the destination block counter.

14. The tensor traversal engine of claim 12, wherein the data buffer comprises a transpose buffer.

15. The tensor traversal engine of claim 12:
wherein the control signal register is configured to store the control signal for a stride d data transfer operation from the source memory component to the destination memory component, the control signal:
representing the custom source access pattern;
representing a strided destination access pattern; and
comprising:
the base source pointer array address;
a destination stride length;
a destination stride count; and
a destination block count;
further comprising a destination stride counter; and
wherein the control logic is further communicatively coupled to the destination stride counter.

16. The tensor traversal engine of claim 12:
wherein the control signal register is configured to store the control signal for a strided data transfer operation from the source memory component to the destination memory component, the control signal:
representing a strided source access pattern;
representing the custom destination access pattern; and
comprising:
a source stride length;
a source stride count;
a source block count; and
a base destination pointer array address;
further comprising a source stride counter; and
wherein the control logic is further communicatively coupled to the source stride counter.

17. The tensor traversal engine of claim 12:
wherein the control signal register is configured to store the control signal for the data transfer operation from the source memory component to the destination memory component, the control signal:
representing the custom source access pattern comprising the set of source data blocks in the source memory component;
representing the custom destination storage pattern comprising the set of destination blocks in the destination memory component; and
comprising:
the base source pointer array address;
a source pointer array length;
the base destination pointer array address; and
a destination pointer array length;
further comprising a source pointer array queue configured to store a set of source pointer array elements characterized by the source pointer array length; and
further comprising a destination pointer array queue configured to store a set of destination pointer array elements characterized by the destination pointer array length.

18. The tensor traversal engine of claim 12:
wherein the control signal register is configured to store the control signal for the data transfer operation from the source memory component to the destination memory component, the control signal:
representing the custom source access pattern comprising the set of source data blocks in the source memory component;

representing the custom destination storage pattern comprising the set of destination blocks in the destination memory component; and comprising:
the base source pointer array address;
a source pointer array length;
the base destination pointer array address; and
a destination pointer array length;

further comprising:
a destination pointer address register; and
a destination pointer array counter; and wherein the control logic is further communicatively coupled to:
the destination pointer address register; and
the destination pointer array counter.

19. The tensor traversal engine of claim 18, wherein the control logic is configured to:
write the base source pointer array address to the source pointer address register;
write the source pointer array length to the source pointer array counter;
write the base destination pointer array address to the destination pointer address register;
write the destination pointer array length to the destination pointer array counter; and
in response to a current destination pointer array count in the destination pointer array counter representing at least one destination pointer array element remaining in the destination pointer array:
read a current destination pointer array address in the destination pointer address register;
read the destination address for a destination block in the set of destination blocks from the destination pointer array element at the current destination pointer array address;
write the destination address for the destination block to the destination address register;
transfer the source data block in the data buffer to the destination address in the destination component;
increment the current destination pointer array address in the destination pointer address register; and
decrement the current destination pointer array count in the destination pointer array counter.

* * * * *